Jan. 4, 1927.

J. M. STEWARD 1,613,542

PLANTER

Filed April 30, 1926 2 Sheets-Sheet 1

John M. Steward, INVENTOR.

BY

Geo. P. Kimmel, ATTORNEY.

Jan. 4, 1927.
J. M. STEWARD
PLANTER
Filed April 30, 1926    2 Sheets-Sheet 2
1,613,542
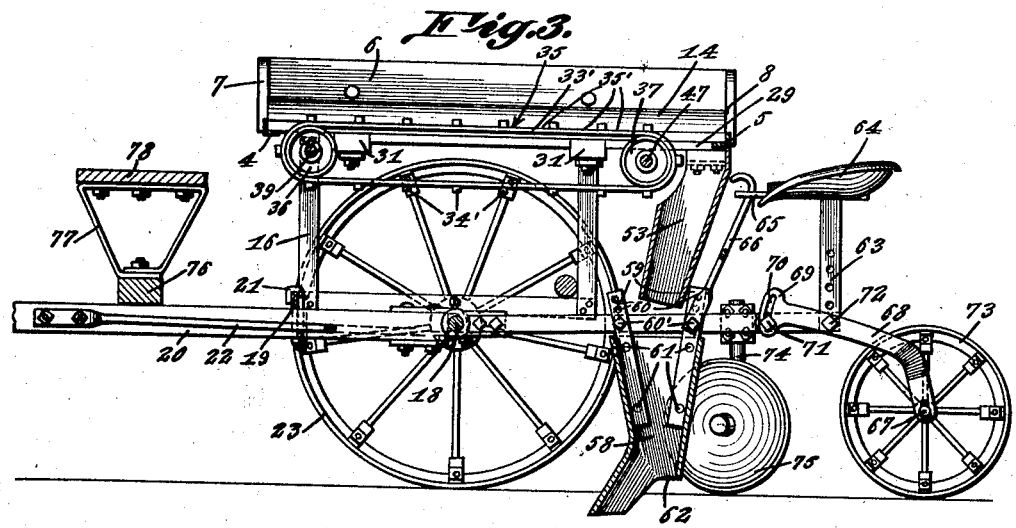
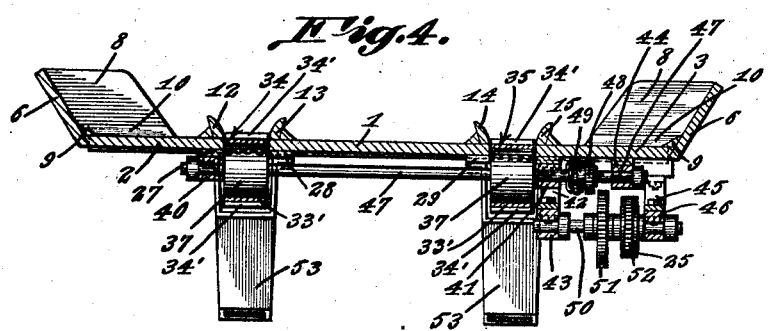
John M. Steward, INVENTOR.
BY
Geo. P. Kimmel, ATTORNEY.

Patented Jan. 4, 1927.

1,613,542

UNITED STATES PATENT OFFICE.

JOHN M. STEWARD, OF SALEM, OREGON.

PLANTER.

Application filed April 30, 1926. Serial No. 105,860.

This invention relates to an agricultural machine, of the planter type, and is designed primarily for the planting of peppermint roots, but it is to be understood that a planter, in accordance with this invention can be employed for any purposes for which it is found applicable, and the invention has for its object to provide, in a manner as hereinafter set forth, a new and improved planter for efficiently and expeditiously planting peppermint roots at a material saving in time and cost of labor with respect to the present methods or means now employed for such purpose.

Further objects of the invention are to provide, in a manner as hereinafter set forth, a planter for the purpose referred to which is comparatively simple in its construction and arrangement, strong, durable, compact, thoroughly efficient and convenient in its use, readily assembled, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

Figure 3 is a section on line 3—3, Figure 1.

Figure 4 is a section on line 4—4, Figure 2.

Figure 1:
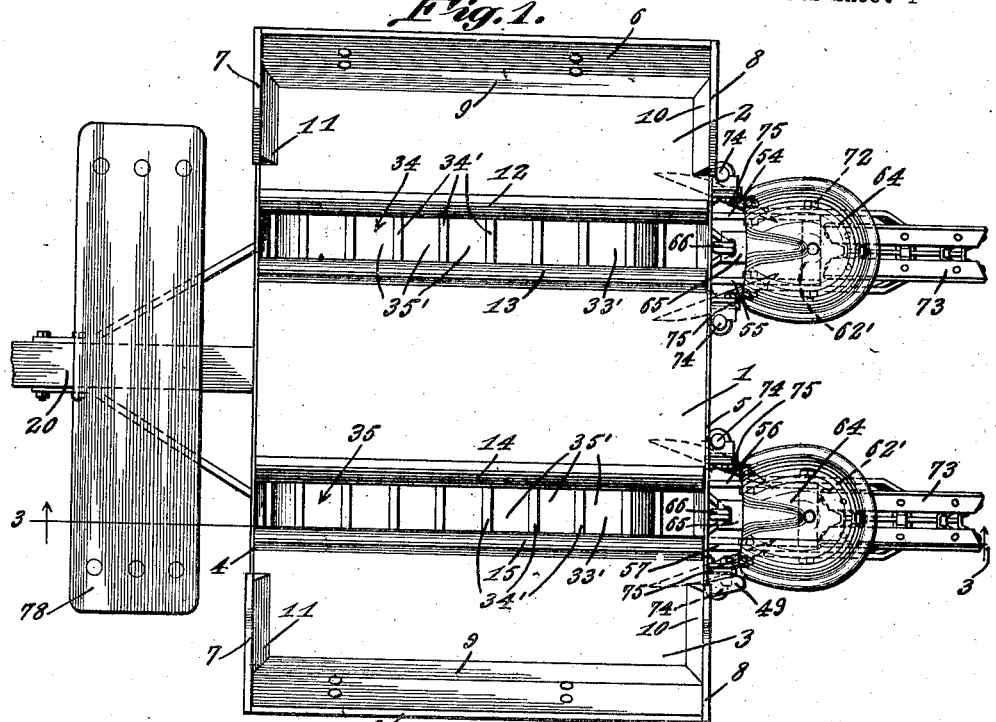
Figure 1 is a top plan view of a planter in accordance with this invention.
Figure 2:
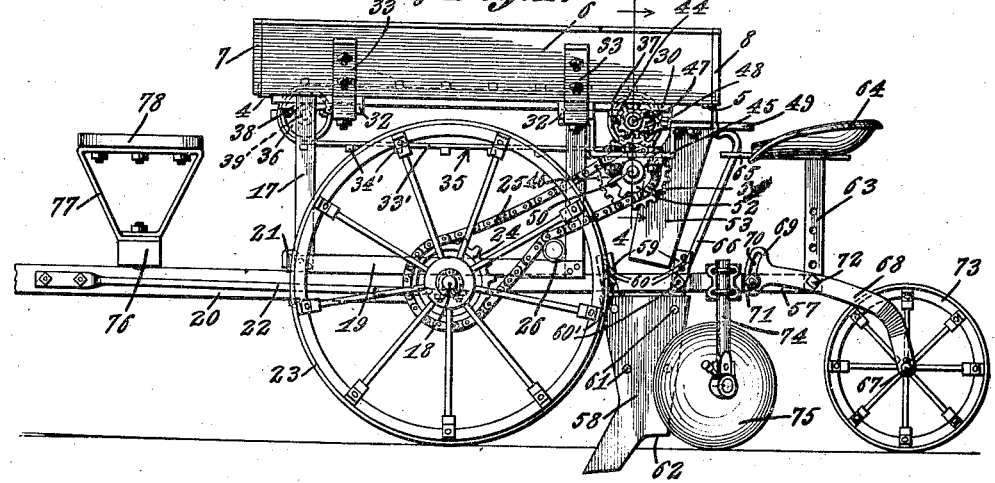
Figure 2 is a side elevation thereof.

A planter, in accordance with this invention, can be employed to plant simultaneously a plurality of rows of roots, and as shown is constructed for the planting of two rows of roots, but it is to be understood that it can be used for planting a single row of roots, or for simultaneously planting two or more rows of roots. Traction for the planter can be provided by a tractor or any other suitable means.

The planter includes a platform which is disposed transversely with respect to the row or rows of roots planted, or transversely disposed with respect to the line of draft. The platform, which may be termed a carrier for a body of roots to be planted, consists of a central section 1 and a pair of end sections 2, 3. The sections of the platform are arranged in opposed relation, but the section 1 is spaced from the section 2 and also from the section 3. The forward ends of the sections of the platform are secured together by a bar 4, and the rear ends of the sections of the platform are secured together by a bar 5. The bars 4 and 5 extend from one end to the other end of the platform. The section 2, as well as the section 3, has secured thereto as well as projecting upwardly therefrom, wall-forming members 6, 7 and 8. The wall-forming members 6 are secured to the outer sides of the sections 2 and 3 and are disposed at an inclination with respect thereto. The inclination being outward, the wall-forming members 7 and 8 are secured to the ends of the sections 2 and 3 and are vertically disposed. The length of the wall-forming members 7 and 7 are less than the width of the sections 2, 3. The wall-forming members secured to the sections 2 are oppositely disposed with respect to the wall-forming members secured to the section 3. Secured to the upper face of the sections 2 and 3 are beveled deflecting bars 9, 10 and 11. Said bars are of less height than the height of the wall-forming members and are positioned against the inner face, at the lower portions of said wall-forming members. The bars 9 are secured to the wall-forming member 6, the bars 10 to the wall-forming members 8 and the bars 11 to the wall-forming members 7. The wall-forming members and bars carried by the section 2 or 3 provides a bin for a body of roots. The bins are oppositely disposed with respect to each other and each bin is of less width than the width of its respective section. The sections 2 and 3 form the bottoms of the bins and these latter have open inner sides. Section 1 can also be used to carry roots. The bins can be extended to store roots for supply purposes.

Secured to the upper face of the section 2 at the inner side thereof is a lengthwise extending root-retainer member 12. Secured to each side of the section 1 and extending lengthwise thereof is a root-retainer member and the said members secured to the section 1 are indicated at 13, 14. Secured to the inner side of the section 3 and extending lengthwise thereof is a root-retainer member 15. The root retainer members extend from the bar 4 to the bar 5. The root retainer member 12 associates with the root retainer member 13 and said members are oppositely flared with respect to each other. The root retainer member 14 associates with the root retainer member 15 and the said members are oppositely flared with respect to each other. The root retainer members extend a substantial distance above the upper face of the platform and their function is to retain the roots on a pair of conveying devices and these latter will presently be referred to. The conveyor devices are positioned in the spaces formed between the sections of the platform and extend from the front to the rear of the latter.

The platform or carrier is mounted upon a supporting frame consisting of a pair of vertically disposed U-shaped sections 16, 17 which are secured at their upper ends to the sections 2 and 3 of the platform and at their lower ends to the axle 18. The sections 16 and 17 are connected together, at the front thereof, by a brace member 19 which seats on the beam 20 and is coupled therewith by a hook-member 21. The tongue 20 is connected at its rear to the axle 18 and has associated therewith a pair of oppositely extending brace rods 22 secured at their forward ends to the sides of the tongue 20 and at their rear ends to the axle 18. Revolubly mounted on the axle at each end thereof is a traction wheel 23 and secured to the inner side of the hub and one of the wheels 23 is a sprocket wheel 24 which is bodily carried with that traction wheel to which it is attached. The sprocket wheel 24 drives a transmission belt 25 of the link type. The belt 25 projects upwardly from the sprocket wheel 24 at an inclination and further extends rearwardly with respect to the axle 18. The lower portion of the chain 25, that is to say the lower side thereof, travels over an anti-friction roller 26 supported by the sections 16 and 17 of the frame which supports the platform or carrier. The chain 25 projects rearwardly with respect to the supported frame for the platform or carrier.

Secured to the lower face of the section 2 of the platform and flush with the inner side thereof is a lengthwise extending bar 27. Secured to the lower face of the section 1 of the platform is a pair of lenthwise extending bars 28, 29 and which are flush with the side edges of the section 1. Secured to the lower face of the section 3 of the platform and flush with the inner edges thereof is a lengthwise extending bar 30. The bars 27, 28, 29 and 30 extend from the forward end to the rear end of the sections of the platform. A pair of spaced blocks are secured to the lower face of the section 2 of the platform and which register with the outer side edges of said section. A pair of spaced blocks are secured to the lower face of the section 3 of the platform and which register with the outer side edge of said section. The blocks secured to the section 2 are indicated at 31 and the blocks secured to the section 3 are indicated at 32. Straps or brackets 33 are secured to the wall-forming members 6 and to said blocks for the purpose of securing said wall-forming members with the sections 2 and 3 of the platform, as well as for reinforcing or bracing the said wall-forming members.

Operating in the space formed between the sections 1 and 2 of the platform is a conveyor device referred to generally by the reference character 34 and operating in the space formed between the sections 1 and 3 of the platform is a conveyor device referred generally by the reference character 35. The conveyor devices extend from the front to the rear of the platform, but are spaced from the bars 4 and 5. Each conveyor device consists of an endless flexible belt 33' of appropriate width and which has secured to its outer face a series of spaced transversely extending slats 34', forming in connection with the belt a series of pockets 35', for the reception of the peppermint roots. Each conveyor device further includes a pair of pulleys 36, 37 over which the belt 33' travels and the pulley 37 provides means for tightening the belt. Secured to and depending from the forward end of the section 2 as well as the section 3, of the platform or carrier, is a bearing element 38, and mounted in said element is a shaft 39 which is common to the pulleys 36 of the pair of conveying devices. Preferably the bearing elements 38 are secured to the bars 27 and 30.

Secured to the bar 27 and depending therefrom is a bearing element 40. Secured to the bar 30 and depending therefrom is a bearing element 41. Secured to the bar 30 and depending therefrom is a hanger 42 provided at its lower end with a bearing element 43. Secured to the section 3 of the platform and depending therefrom is a bearing element 44. Secured to the section 3 and depending therefrom is a hanger 45 provided at its lower end with a bearing element 46. The pulleys 37 of the conveying devices are carried by a shaft 47, which is mounted in the bearing elements 40, 41 and 44 and carries a pinion 48 between the bearing elements 30 and 44. The pinion 48 is loosely mounted on the shaft 47 and has associated therewith a clutching mechanism 49 for the purpose of shifting said pinion 48, to engage with a driving element therefor, and further for clutching the pinion 48 to the shaft 47 whereby the latter will be revolved or operated when the pinion 48 is shifted to a position to be driven by its driving element.

Mounted in the bearing elements 43 and 46 is a power transmitting shaft 50 provided with a gear 51 which forms the driving element for the pinion 48. The shaft 50 is furthermore provided with a cog pinion 52 which is engaged and operated by the belt 25. From the foregoing construction it is obvious when the planter is pulled forwardly, it will provide for the revolving of the gear 24, which in turn will operate the belt 25, and the latter meshing with the pinion 52 will provide for the operation of the shaft 50 and the gear 51, and the latter meshing with the pinion 48 will cause the operation of the shaft 47, which in turn will provide for the drive of the conveyor devices. The upper length of the belt of each conveyor device will travel in a direction from front to rear of the platform or carrier and the lower length of the belts of the conveyor devices will move in a forward direction that is from rear to front of the platform or carrier.

Secured to the bars 27 and 28 rearwardly of each pulley 37, is a depending conducting chute 53 for receiving the roots and depositing them into a furrow opener. The chutes have their upper ends enlarged and arranged in a manner to receive the roots when they are discharged from the rear of the belts of the conveyor devices.

Connected at their forward ends to the axle 18 and extending rearwardly a substantial distance beyond the chutes 53 are two pairs of supporting arms. The arms of one pair are indicated at 54, 55, and the arms of the other pair at 56, 57. The arms of each pair are spaced a substantial distance with respect to each other, and a chute 53 is arranged directly over the spaces between the pair of arms. The pairs of arms are positioned in proximity to the lower ends of the chutes 53. Adjustably connected with the arms of each pair is a hollow furrow opener or shoe 58. The major part of the body portion of the furrow opener 58 gradually increases in size in an upward direction, and extending into the furrow opener 58 at the top thereof are two pairs of hangers 59, which have the upper portions thereof formed with a series of spaced slots 60 for the passage of hold fast devices to adjustably connect the furrow opener 58 to a pair of arms. The pair of arms with which a furrow opener 58 is associated are apertured for the passage of the hold-fast devices 60'. The two pair of hangers which associate with a furrow opener are fixedly secured therewith by the hold-fast devices 61. The lower end of each furrow opener 58 is open and the rear part thereof is positioned above the forward part as indicated at 62. The roots are conducted by the chute 53 in the manner to fall into the top of the furrow opener 58 and the roots are discharged from the lower open end of the furrow opener. The furrow openers 58 are connected to the pair of arms in a manner whereby the gear hangers of the pairs of hangers can be disconnected from the pairs of arms, and the furrow openers 58 drawn upwardly on the hold fast devices employed to connect the forward hangers to the pairs of arms. Each pair of arms at the rear thereof are connected together by a brace member 62' to which is attached a seat post 63 provided at its upper end with a seat 64, and said post 63 has connected therewith a forwardly extending apertured plate 65 which carries the seat. The seat can be moved forward and backward to the most comfortable location for the operator. A hook bar 66, is connected at its lower ends with the rear hangers of the furrow member 58. When turning at the ends of the rows or moving the planter the bar 66 is hooked over bar 5 which raises and holds the furrow openers or shoes above the ground and allows free moving of the machine.

Connected to each pair of rearwardly extending arms, is an adjustable supporting wheel carrier and which consists of an axle 67, carried by a pair of spaced upwardly extending and forwardly projecting curved arms 68 having the forward ends thereof enlarged as at 69, and slotted as at 70. Hold fast devices 71 extend through the slots 70 of each pair of curved arms and engage with a pair of rearwardly extending arms whereby the curved arms 68 are secured to the rearwardly extending arms. The arms 68 are also connected to the rearwardly extending arms by the hold-fast devices 52. The slotted forward ends 69 of the curved arm 68, in connection with the hold-fast devices 71, provide means for adjustably positioning the rear ends of the curved arms 68. Mounted on the axle 67 is a supporting wheel 73. Secured to the outer face or side of each of the arms of said pairs of rearwardly extending arms is a depending hanger member 74, carrying a covering wheel or member 75. The wheels 75 which are connected with each pair of rearwardly extending arms are disposed at an inclination and extend in opposite directions with respect to each other.

The slots 70 and hold-fast devices 71 are used only to adjust the position of the back wheel which regulates the depth of the furrow opener. The only pivot action of the rearwardly extending arms 54, 55, 56 and 57 is at the axle 18 and is connected there by a bearing member.

Mounted upon the tongue 20, forwardly with respect to the platform or carrier, is a support 76 having secured therewith upstanding brackets 77, to which is attached a seat 78. The support 76, brackets 77 and seat 78 provide a bench forwardly of the platform or carrier.

When the planter is used, two men are employed for each conveyor device for positioning the roots in the pocket of the belt of the conveying device. As the planter is illustrated with two conveying devices, provision is made for the seating of four men, two at the front of the platform and two at the rear thereof. While the planter is propelled, by any suitable means, or rather pulled forwardly by any suitable means, the conveyor devices are operated from one of the traction wheels 23 and during the operation of the conveyor devices the roots are placed in the pockets of the belt thereof, and the roots conveyed and is discharged into the chutes 53, and from the chutes are deposited in the furrow openers 58. As the planter moves forwardly the furrow openers operate and the roots are deposited into the furrows. After the roots are deposited the covering wheels act to cover the roots.

The rear wheels 73 not only carry the two men seated back of the platform but also press the dirt firmly about the roots. The open wheel presses the sides of the furrows and not the top so no baking of the soil occurs. Slots 70 and hold fast devices 71 are so arranged that the rear wheels can be raised or lowered thus securing the amount of pressure desired over the roots. The furrow covering wheels are adjustable as to depth and angle with each other. Also the rearward arms have an adjustment at the axle to the end that proper depth, cover and pressure may be secured in all classes of soils.

It is though that the many advantages of a planter, in accordance with this invention, can be readily understood, and although the preferred embodiment of the invention is as illustrated and described, yet it is to be understood that changes in the details of construction can be had which will fall within the scope of the invention as claimed.

What I claim is:

A planter comprising a portable supporting structure, a sectional platform mounted on the top thereof, a manually supplied conveyor device operating between the sections of and extending from a point removed from the front of to a point removed from the rear of the platform for conveying the material to be planted, said device operating in a rearward direction, operating means for said device carried by and driven from said structure when the latter is propelled, a conducting chute suspended from the platform below and at the rear end of said device for receiving the material to be planted from the latter, a furrow opener suspended from said structure at the rear thereof and below said chute for receiving the material to be planted from the latter, a seat positioned on said structure rearwardly of said platform, a seat positioned on said structure forwardly of said platform, said platform projecting laterally from each side of said structure, and means secured to the upper face of each of the projecting portions of the platform to provide a bin adjacent to and spaced from each side of said device and with each of said bins open at the inner side thereof.

In testimony whereof, I affix my signature hereto.

JOHN M. STEWARD.